US010339568B2

(12) United States Patent
Bitoun

(10) Patent No.: US 10,339,568 B2
(45) **Date of Patent: *Jul. 2, 2019**

(54) AUDIO-TRIGGERED NOTIFICATIONS FOR MOBILE DEVICES

(71) Applicant: A9.com, Inc., Palo Alto, CA (US)

(72) Inventor: Lionel Bitoun, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/227,030

(22) Filed: Aug. 3, 2016

(65) Prior Publication Data

US 2016/0343035 A1 Nov. 24, 2016

Related U.S. Application Data

(63) Continuation of application No. 13/532,420, filed on Jun. 25, 2012, now Pat. No. 9,412,120.

(51) Int. Cl.

| | |
|---|---|
| ***G06Q 30/02*** | (2012.01) |
| ***H04L 29/06*** | (2006.01) |
| ***H04W 4/02*** | (2018.01) |
| ***H04W 4/06*** | (2009.01) |
| ***H04W 68/00*** | (2009.01) |

(52) U.S. Cl.

CPC ..... *G06Q 30/0267* (2013.01); *G06Q 30/0242* (2013.01); *H04L 63/08* (2013.01); *H04W 4/023* (2013.01); *H04W 4/06* (2013.01); *H04W 68/005* (2013.01); *G06Q 30/0251* (2013.01)

(58) Field of Classification Search

CPC ........................................ G06Q 30/0207–0277

See application file for complete search history.

(56) References Cited

U.S. PATENT DOCUMENTS

| | | | | |
|---|---|---|---|---|
| 7,007,166 | B1 | 2/2006 | Moskowitz et al. | |
| 7,349,668 | B2 * | 3/2008 | Ilan ........................ | G06Q 30/02 348/E7.024 |
| 9,058,645 | B1 | 6/2015 | Corley et al. | |
| 2004/0127199 | A1 * | 7/2004 | Kagan .................... | H04H 60/63 455/414.1 |
| 2004/0203852 | A1 * | 10/2004 | Janakiraman ........... | H04W 4/02 455/456.1 |

(Continued)

OTHER PUBLICATIONS

Audio Signal Watermarking Based on Replica Modulation, Rade Petrovic, Telsiks 2001, Sep. 19-21, 2001, NiS, Yugoslavia.*

(Continued)

*Primary Examiner* — David J Stoltenberg

(74) *Attorney, Agent, or Firm* — Thomas Horstemeyer, LLP

(57) ABSTRACT

Disclosed are various embodiments for decoding an audio signal to identify information encoded in a human-imperceptible portion of the audio signal. A client device may capture an audio signal broadcast wirelessly from a transmitting device. A human-imperceptible portion of the audio signal may be decoded to access at least one unique identifier encoded within the audio signal. A request for at least one notification may be sent to a notification service over a network, where the request includes the at least one unique identifier and data associated with the client device. The remote service provides the client device with a notification to render in a display.

20 Claims, 8 Drawing Sheets

(56) References Cited

U.S. PATENT DOCUMENTS

2005/0234774 A1 10/2005 Dupree
2006/0253453 A1* 11/2006 Chmaytelli ....... G06F 17/30867
2007/0157257 A1* 7/2007 Kagan .................... H04W 4/06 725/75
2008/0262928 A1* 10/2008 Michaelis ............. G06Q 30/02 705/14.26
2009/0240561 A1 9/2009 Altberg et al.
2010/0131767 A1* 5/2010 Rhoads ............. G06Q 20/1235 713/176
2010/0222026 A1 9/2010 Dragt
2010/0281545 A1* 11/2010 Levy ...................... G06F 21/10 726/30
2010/0324977 A1 12/2010 Dragt
2011/0029370 A1 2/2011 Roeding et al.
2011/0029598 A1* 2/2011 Arnold ................... H04L 67/26 709/203
2011/0054904 A1* 3/2011 Fenton .................. G06Q 30/06 704/270
2011/0235804 A1* 9/2011 Snyder ................... G06F 21/16 380/255
2011/0238192 A1 9/2011 Shah et al.
2011/0246202 A1 10/2011 McMillan et al.
2012/0075083 A1* 3/2012 Isaacs .............. H04M 3/42382 340/13.2
2012/0214416 A1* 8/2012 Kent ...................... H04W 4/21 455/41.2
2012/0216226 A1 8/2012 Humphrey et al.
2012/0295560 A1* 11/2012 Mufti .................... H04B 13/00 455/95
2013/0013391 A1* 1/2013 Douglas ............ G06Q 30/0207 705/14.39
2013/0048709 A1* 2/2013 Turner .............. G06Q 20/3272 235/375
2013/0081077 A1 3/2013 Mauduit et al.
2013/0096706 A1 4/2013 Srinivasan et al.
2013/0100017 A1 4/2013 Papakipos et al.
2013/0331971 A1 12/2013 Bida et al.
2014/0304068 A1 10/2014 Weinblatt et al.
2014/0344055 A1 11/2014 Sanghavi et al.

OTHER PUBLICATIONS

Data Hiding in Audio Signal: A Review, Dutta et al., International Journal of Database Theory and Application, vol. 2, No. 2, Jun. 2009.*

Data Hiding in Audio Signal, Video Signal Text and JPEG Images, Sathya et al., IEEE-International Conference on Advances in Engineering, Science and Management (ICAESM-2012) Mar. 30, 31, 2012.*

* cited by examiner

AUDIO-TRIGGERED NOTIFICATIONS FOR MOBILE DEVICES

CROSS-REFERENCE TO RELATED APPLICATION

This application is a continuation of and claims priority to co-pending U.S. patent application Ser. No. 13/532,420, entitled "AUDIO-TRIGGERED NOTIFICATIONS FOR MOBILE DEVICES," filed on Jun. 25, 2012, issued as U.S. Pat. No. 9,412,120, the contents of which are incorporated by reference in its entirety herein.

BACKGROUND

Mobile devices are becoming increasingly important in electronic commerce and in the realm of advertising. In the digital era, determining the effectiveness of marketing and advertising campaigns has continued to remain difficult. There is often a lapse of time between a person seeing an advertisement and the person being presented with the opportunity to purchase the subject of the advertisement. Additionally, it is difficult to ascertain the location and/or perceptions of a user when that person is presented with an advertisement.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing real-time notifications to users of mobile devices relating to media to which such users are exposed. Notifications may include, for example, advertisements for products or services, coupons, social networking pages, blog postings, movie trailers, and/or other items. When a person is in the vicinity of a media reproduction, it may be beneficial for an advertiser to provide the person with a notification on the person's mobile device making an offer for the purchase of a product at that time. It may also be beneficial to obtain information about the person and/or the person's reaction to the notification.

As a non-limiting example, an owner of a mobile device may desire to receive exclusive offers about products in the form of real-time notifications relative to the owner's proximity to a media reproduction. The owner of the mobile device may download and install a mobile notification application that permits notifications to be rendered on the display either when they are received or at some time in the future. The owner of the mobile device may volunteer or be required to create a unique user account by providing demographic information such as age, gender, occupation, hobbies, and/or any other information. The owner may further provide products or services about which the owner hopes to receive notifications and/or set limits on when to receive the notifications. As an incentive, the owner may receive notifications that are catered to the owner's particular lifestyle.

According to one embodiment, assume that while an owner of a mobile device is watching a television program in his or her home, an advertisement for a film in the form of a commercial may be shown to the owner. The previously installed mobile notification application may detect an audio signal broadcasted by the commercial that is not perceptible by a human. The mobile notification application may process the audio signal to render a notification to the user showing more information about the film being advertised. Additionally, it may give the owner the option of purchasing tickets for the film.

In a different example, a dedicated device in an aisle of a grocery store may broadcast a similar audio signal that is also imperceptible to a human. The detected audio signal may prompt the mobile notification application to render a coupon in the display of the mobile device corresponding to a product sold on that aisle. In the following discussion, a general description of the system and its components is provided, followed by a discussion of the operation of the same.

Figure 1:
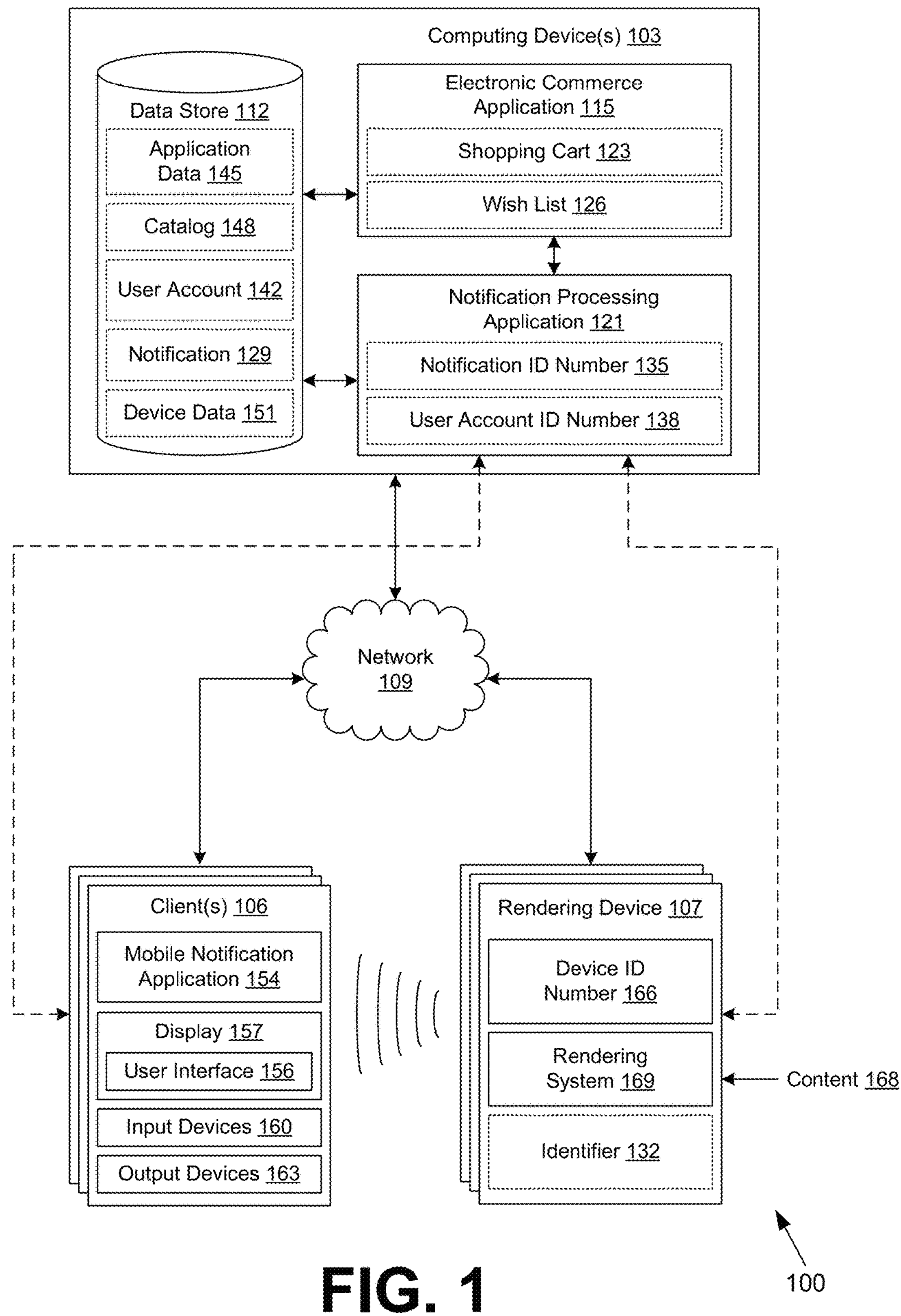
FIG. 1 is a drawing of networked environment according to various embodiments of the present disclosure.

With reference to FIG. 1, shown is a networked environment 100 according to various embodiments. The networked environment 100 includes a computing device 103 in data communication with one or more clients 106 and one or more rendering devices 107 via a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks, or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. In addition, various data is stored in a data store 112 that is accessible to the computing device 103. The data store 112 may be representative of a plurality of data stores as can be appreciated. The data stored in the data store 112 for example, is associated with the operation of the various applications and/or functional entities described below. The components executed on the computing device 103, for example, include an electronic commerce application 115, a notification processing application 121, and other applications, services, processes, systems, engines, or functionality not discussed in detail herein.

The electronic commerce application 115 is executed in order to facilitate the online purchase of items over the network 109. The electronic commerce application 115 also performs various backend functions associated with the online presence of a merchant in order to facilitate the online purchase of items as will be described. For example, the electronic commerce application 115 generates network pages such as web pages or other types of network content that are provided to clients 106 for the purposes of selecting items for purchase, rental, download, lease, or other form of consumption as will be described.

In various embodiments, the electronic commerce application 115 may include an item search engine, an electronic shopping cart 123, an electronic wish list 126 separate from a shopping cart, an item taxonomy, a network page server (e.g., a hypertext transfer protocol (HTTP) server), and/or other components. The electronic commerce application 115 may provide electronic shopping cart 123 functionality and/or other functionality related to electronic commerce.

The notification processing application 121 is executed to facilitate the transmission of a notification 129 or a similar communication to a client 106. For example, a client 106 obtains an identifier 132 from a rendering device 107 that may comprise a notification identification number 135 that is unique to a notification 129. The client 106 transmits a request comprising the notification identification number 135 and a user account identification number 138 to the notification processing application 121. The request is sent to obtain a notification 129 associated with the unique notification identification number 135. The request may be fulfilled or denied based in part on the user account 142 associated with the user account identification number 138.

The data stored in the data store 112 includes, for example, application data 145, a catalog 148, data associated with a user account 142, data associated with a notification 129, device data 151, and potentially other data. The application data 145 corresponds to any data that may be associated with the notification processing application 121, the mobile notification application 154, the electronic commerce application 115, and/or any other application data.

The data associated with the catalog 148 may include information related to a plurality of items offered in the electronic marketplace. An item may refer to a product, good, service, software download, multimedia download, social networking profile, or any combination, bundle, or package thereof, that may be offered for sale, purchase, rental, lease, download, and/or any other form of consumption as can be appreciated. The various product attributes stored in the catalog 148 may include, for example, titles, descriptions, quantities, conditions, images, options, weights, customer reviews, customer ratings, keywords, shipping restrictions, prices, tax classifications, unique identifiers, and any other data related to the items.

The data associated with a user account 142 corresponds to any data that may be associated with users of the mobile notification application 154, the electronic commerce application 115, and/or the notification processing application 121. The user account 142 may embody registered users with accounts or users who are unregistered. The user account 142, for example, may include various identifiers, usernames, passwords, or other information to aid in identification or authentication of the user when the user accesses a network site or the mobile notification application 154. In one embodiment, the user account 142 may include an interaction history of the user, which includes data relating to interactions with previous notifications 129 shown to the user and/or orders placed by the user through the electronic commerce application 115. Also, the user account 142 may include purchase history, browse history on the electronic commerce application 115, addresses, names, payment instruments, and other information.

The notification 129 may include any data to be rendered in a user interface 156 on a display 157 on a client 106. For example, a notification 129 may be an advertisement for products or services, coupons, social networking pages, blog postings, movie trailers, and/or other items. The data embodying the notification 129 may include images of a product, attributes of a product or service, a video file of a commercial, display information, and/or any other appropriate type of data.

The device data 151 describes various features and specifications of a rendering device 107 and/or the client 106. For example, if client 106 were a mobile phone, tablet computer, or electronic reading device, information describing the device may be stored as device data 151. Information describing the device, if applicable, may include battery life, resolution of the display 157, data associated with input devices 160 and output devices 163, carrier information, bandwidth restrictions, and/or any other information associated with the device.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a mobile notification application 154 and/or other applications. The mobile notification application 154 may be executed in a client 106 for example, to access and render network pages, such as web pages, or other network content served up by the computing device 103 and/or other servers. The client 106 may be configured to execute applications beyond mobile notification application 154 such as, for example, email applications, instant message applications, and/or other applications.

Next, a general description of the operation of the various components of the networked environment 100 is provided. As a non-limiting example, assume an owner of a mobile device is shopping at a particular store. A rendering device 107 located in a particular aisle of the store may have a unique device identification number 166 associated with the device. It may be beneficial to know where a device is located and/or other information associated with the device. For example, it may be beneficial to know that the rendering device 107 is located in a particular aisle of a store. A notification processing application 121 may identify the rendering device 107 using the unique device identification number 166.

For example, assume that the rendering device 107 is located in an aisle that sells groceries. An advertiser may want to transmit coupons for a certain product to owners of mobile devices located in the aisle of the store. A coupon may be transmitted as a notification 129. The notification processing application 121 may associate a notification identification number 135 with a notification 129 and send the notification identification number 135 to the rendering device 107. The rendering device 107 may encode the notification identification number 135 received from the notification processing application 121 into an audio-based identifier 132 via a rendering system 169.

Alternatively, an identifier 132 may be encoded in places other than rendering system 169. For example, a television may act as a rendering device 107. Content 168 comprising an identifier 132 may be provided to the rendering device 107 eliminating the need of a rendering system 169. As a non-limiting example, content 168 may be provided to the television in the form of a television commercial or other program with an identifier 132 already embedded in the audio component of the commercial. By rendering the television commercial, the identifier 132 may communicate a notification identification number 135 to a client 106 through the audio component of the commercial.

As is shown in the example above, it is understood that the components of the rendering device 107 are optional. If the rendering device 107 is a device dedicated to broadcasting notifications 129, it may be beneficial to identify the rendering device 107 in order to determine its location, thereby facilitating the determination of which notification 129 to broadcast. For example, a department store may have a rendering device 107 in an aisle capable of both communicating through the network 109 and capable of rendering an identifier 132. The department store may frequently vary the product it wishes to advertise on a particular aisle from day to day. A device identification number 166 may assist in determining which aisle in the department store the rendering device 107 is located. On the other hand, a television generally will not have a rendering system 169 and/or a device identification number 166. Thus, it may be difficult or impossible to obtain the identification of a specific television rendering an identifier 132.

The rendering device 107 may render the identifier 132 comprising the notification identification number 135. A client 106, such as a mobile device, for example, capable of detecting and/or receiving the identifier 132, may record the identifier 132. The client 106 then decodes the recording of the identifier 132 in order to determine a notification identification number 135 originally encoded in the identifier 132. The client 106 then sends a request for a notification 129 by communicating with the notification processing application 121 through network 109. It is understood that the request may comprise of the notification identification number 135 as well as a user account identification number 138 associated with the owner of the client 106.

Upon receiving the request for a notification 129 from the client 106, the notification processing application 121 may associate a user account 142 with the user account identification number 138 as well as associate a notification 129 with the notification identification number 135. The notification processing application 121 may determine whether to fulfill the request from the client 106. For example, the notification 129 may comprise data associated with a targeted demographic, a maximum number of views desired, and/or other data assisting in making a determination whether to transmit the notification 129 to the client 106. Additionally, the user account 142 may have preferences not to receive notifications 129 of a certain type.

The notification processing application 121 may then determine whether the client 106 meets the requirements to send the notification 129 to the client 106. For example, the notification processing application 121 may determine whether the user account 142 associated with the client 106 meets the targeted demographic by analyzing data associated with the user account 142. Further, if an owner of a mobile device client 106 has already walked down an aisle of a store, it may be determined not to transmit the same notification 129 to the user unless a predetermined amount of time has elapsed. If the notification processing application 121 determines that all requirements associated with the notification 129 are met, the notification processing application 121 may transmit a response to the client 106 containing the notification 129 with or without instructions detailing when and how the client 106 should display the notification 129. If the requirements are not met, the notification processing application 121 may transmit a response detailing why the notification 129 will not be transmitted to client 106 and/or may not transmit a response at all. Finally, if a notification 129 is transmitted to the client 106, the notification 129 may be rendered in the display 157 via the mobile notification application 154 and/or by any other means.

Figure 2:
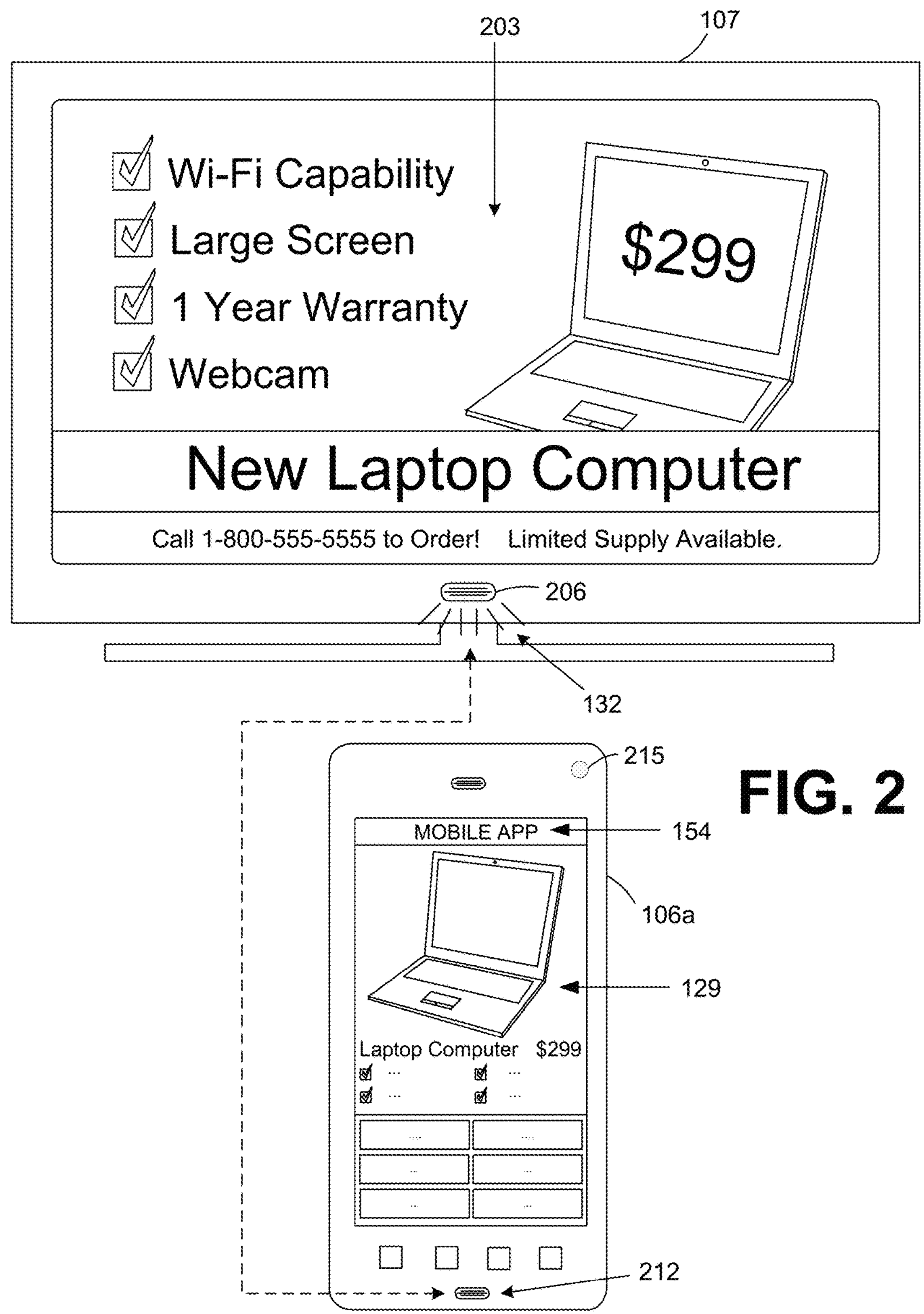
FIG. 2 is a drawing of an example of a user interface rendered by a client in the networked environment of FIG. 1 according to various embodiments of the present disclosure.

Referring next to FIG. 2, shown is a mobile device receiving a broadcast from the rendering device 107. In this non-limiting example, the rendering device 107 is depicted as a television playing an advertisement 203 in the form of a television commercial for a new laptop computer. The television speaker 206 is playing the audio component of the commercial in which an identifier 132 may be embedded. As the audio component is rendered during the playback of the television commercial, the identifier 132 embedded in the audio signal may be detected at a frequency imperceptible to a person watching the commercial.

An embodiment of a client 106 (FIG. 1), shown in this example as a mobile device 106*a*, may capture the audio component of the commercial using a microphone 212 common on most mobile devices 106*a*. The mobile notification application 154, in combination with the mobile device 106*a*, may decode the audio component to isolate the identifier 132. The identifier 132 may comprise, for example, a notification identification number 135 (FIG. 1). The mobile device 106*a* transmits the notification identification number 135 to the notification processing application 121 (FIG. 1). In return, the mobile device 106*a* receives a notification 129 from the notification processing application 121. The mobile notification application 154 running on the mobile device 106*a* then renders the notification 129 on a display 157 (FIG. 1). In this example, the notification 129 received offers the user an opportunity to purchase the laptop computer presented simultaneously as the laptop computer is advertised on the television commercial. An indicator 215 may be used to notify a user of an impending notification 129. In this non-limiting example, the mobile notification application 154 utilizes a light-emitting diode common on mobile devices 106*a* as an indicator 215.

Figure 3:
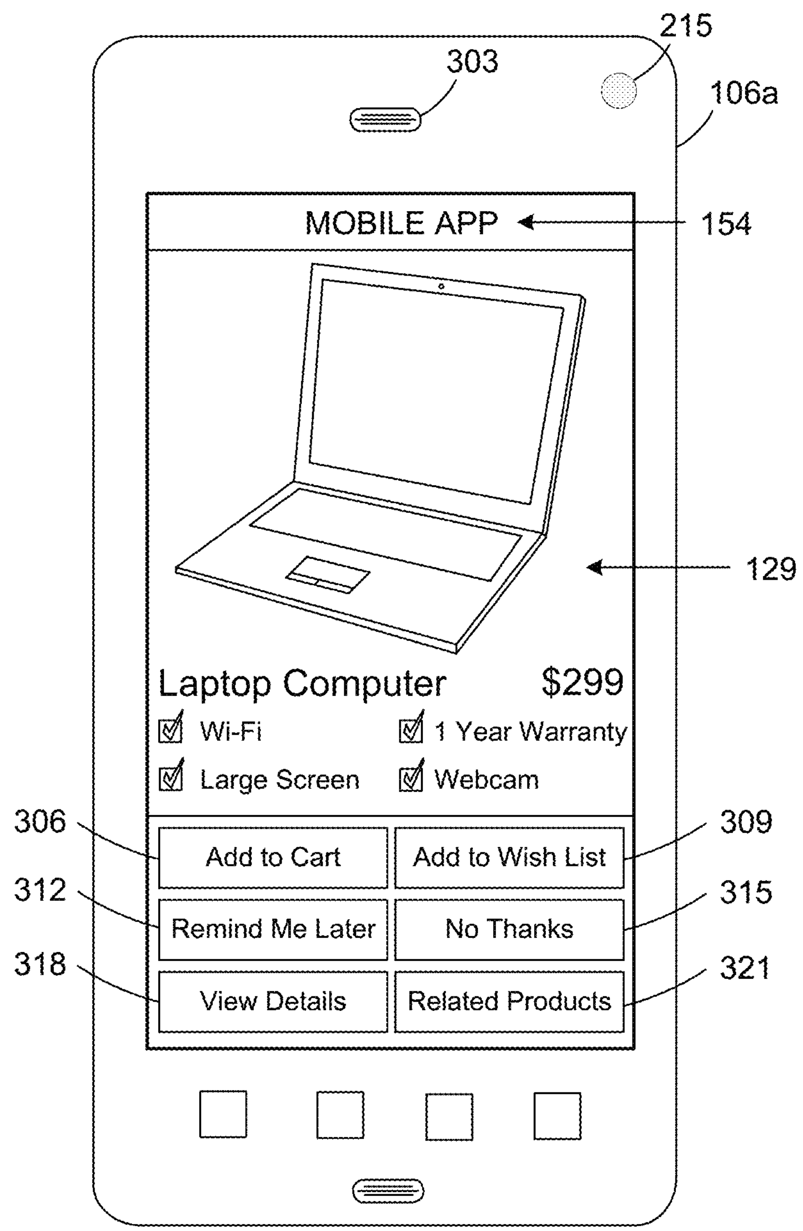
FIG. 3 is a drawing of an example of a user interface rendered by a client in the networked environment of FIG. 1 according to various embodiments of the present disclosure.

Moving on to FIG. 3, shown is a further view of the mobile device 106*a* that depicts the features of the mobile notification application 154 (FIG. 1). In this non-limiting example, a notification 129 (FIG. 1) is rendered in the mobile notification application 154 on the mobile device 106*a*. The mobile notification application 154 causes the mobile device 106*a* to illuminate a light-emitting diode common on mobile devices 106*a* to be used as an indicator 215 (FIG. 2) of an impending notification 129. A speaker 303 on the mobile device 106*a* may also be used to render any audio that may be present in the notification 129.

The mobile notification application 154 may also interact with an electronic commerce application 115 (FIG. 1). For example, a user may wish to purchase an item being advertised or otherwise depicted in the notification 129. Button 306 permits the user to add the item to an electronic shopping cart 123 (FIG. 1) that may be associated with an account unique to the owner of the mobile device 106*a*. Alternatively, if the user desires to purchase the product in the future, the user may add the item to an electronic wish list 126 (FIG. 1) separate from an electronic shopping cart 123 via button 309. A user may wish to see the notification 129 at a later time and may set a reminder via button 312.

If the user is certain about not purchasing the item being advertised or is finished viewing the notification 129, button 315 may permit the user to exit the view of the notification 129 and/or the mobile notification application 154. On the other hand, if the user desires to view more information about the item being advertised, the user may manipulate button 318 to view, for example, an information page pertaining to the product or service being advertised in the notification 129. If the user wishes to search for products related to the item being advertised, the user may do so via button 321.

Figure 4:
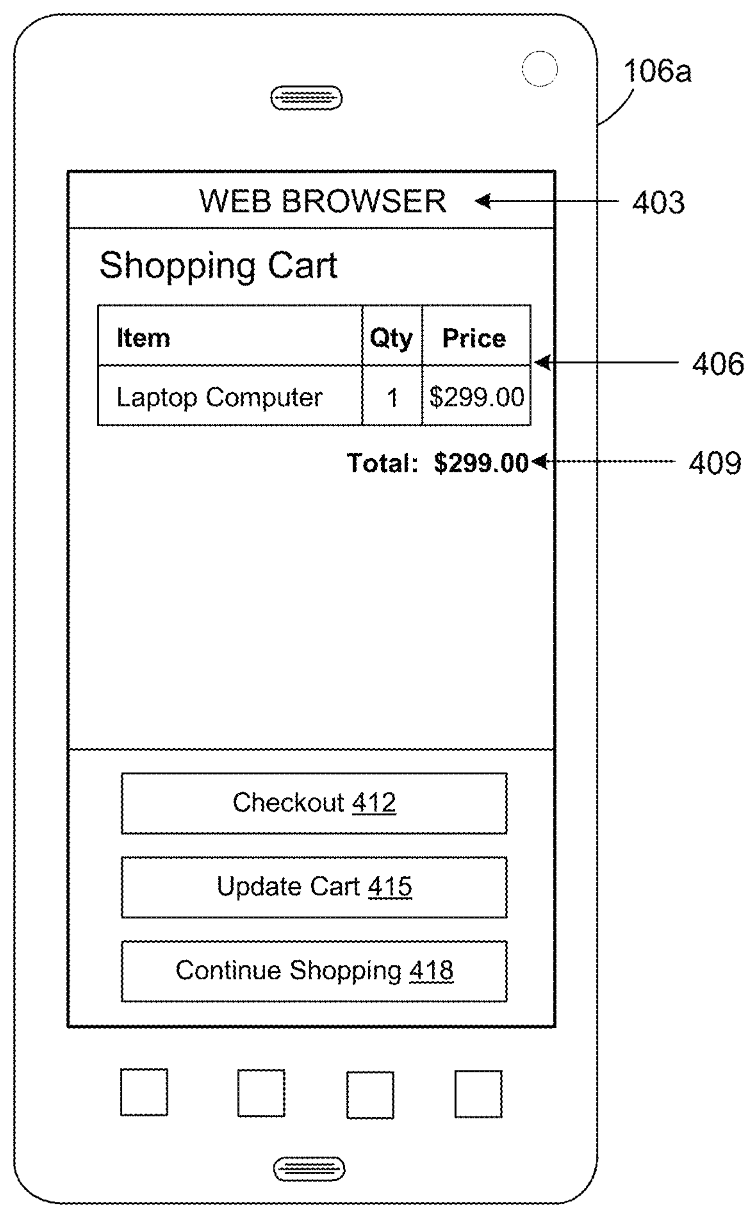
FIG. 4 is a drawing of an example of a user interface rendered by a client in the networked environment of FIG. 1 according to various embodiments of the present disclosure.

Moving on to FIG. 4, shown in an electronic shopping cart 123 (FIG. 1) rendered in a mobile web browser application 403 on a mobile device 106*a*. It is understood that the electronic shopping cart 123 may also be implemented in the mobile notification application 154 (FIG. 1). In this non-limiting example, the product advertised in a notification 129 (FIG. 2), is shown in the electronic shopping cart 123, facilitating the purchase of the item using mobile commerce. In this example, the product name, quantity, and price may be listed in an information table 406. It is understood that more information pertaining to the product(s) in the electronic shopping cart 123 may be added to table 406. The total price 409 of all the items in the cart may be shown.

Users may initiate a "checkout" process or complete the purchase of the items in the electronic shopping cart by manipulating button 412 to cause one or more user interfaces 156 to implement a checkout pipeline. Button 415 may be manipulated by the user to initiate updating the items, quantities, and/or prices of the items in the electronic shopping cart 123. Alternatively, button 418 may permit the user to continue shopping for items in the electronic commerce application 115 (FIG. 1).

Figure 5:
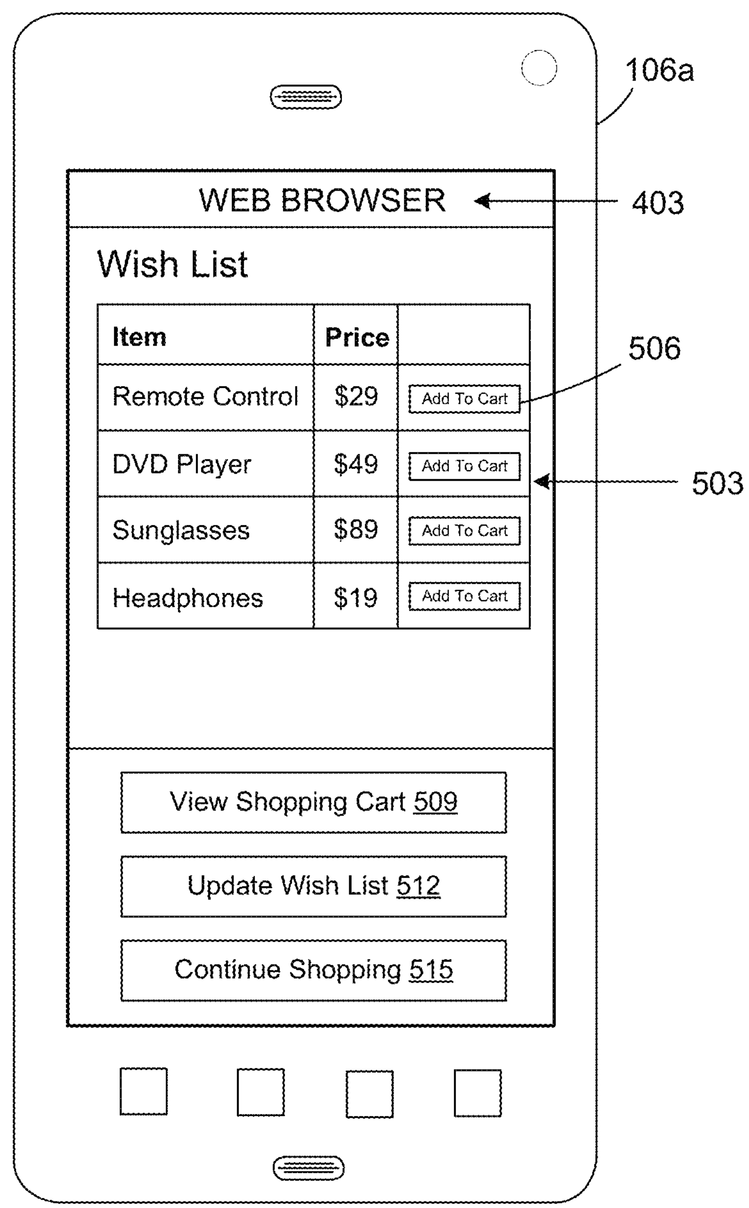
FIG. 5 is a drawing of an example of a user interface rendered by a client in the networked environment of FIG. 1 according to various embodiments of the present disclosure.

Next, in FIG. 5, shown in an electronic wish list 126 (FIG. 1) rendered in a mobile web browser application 403 (FIG. 4) on a mobile device 106*a*. Similar to the items shown in an electronic shopping cart 123 (FIG. 1) in FIG. 4, items may be shown in table 503 corresponding to items in the electronic wish list 126. It is understood that a user may initiate the transfer of one or more items from the electronic wish list 126 to an electronic shopping cart 123 by manipulating button 506. Button 509 may initiate the rendering of the electronic shopping cart 123 in the display 157. Button 512 may be manipulated by the user to initiate updating the items, quantities, and/or prices of the items in the electronic wish list 126. Alternatively, button 515 may permit the user to continue shopping for items in the electronic commerce application 115 (FIG. 1).

Figure 6:
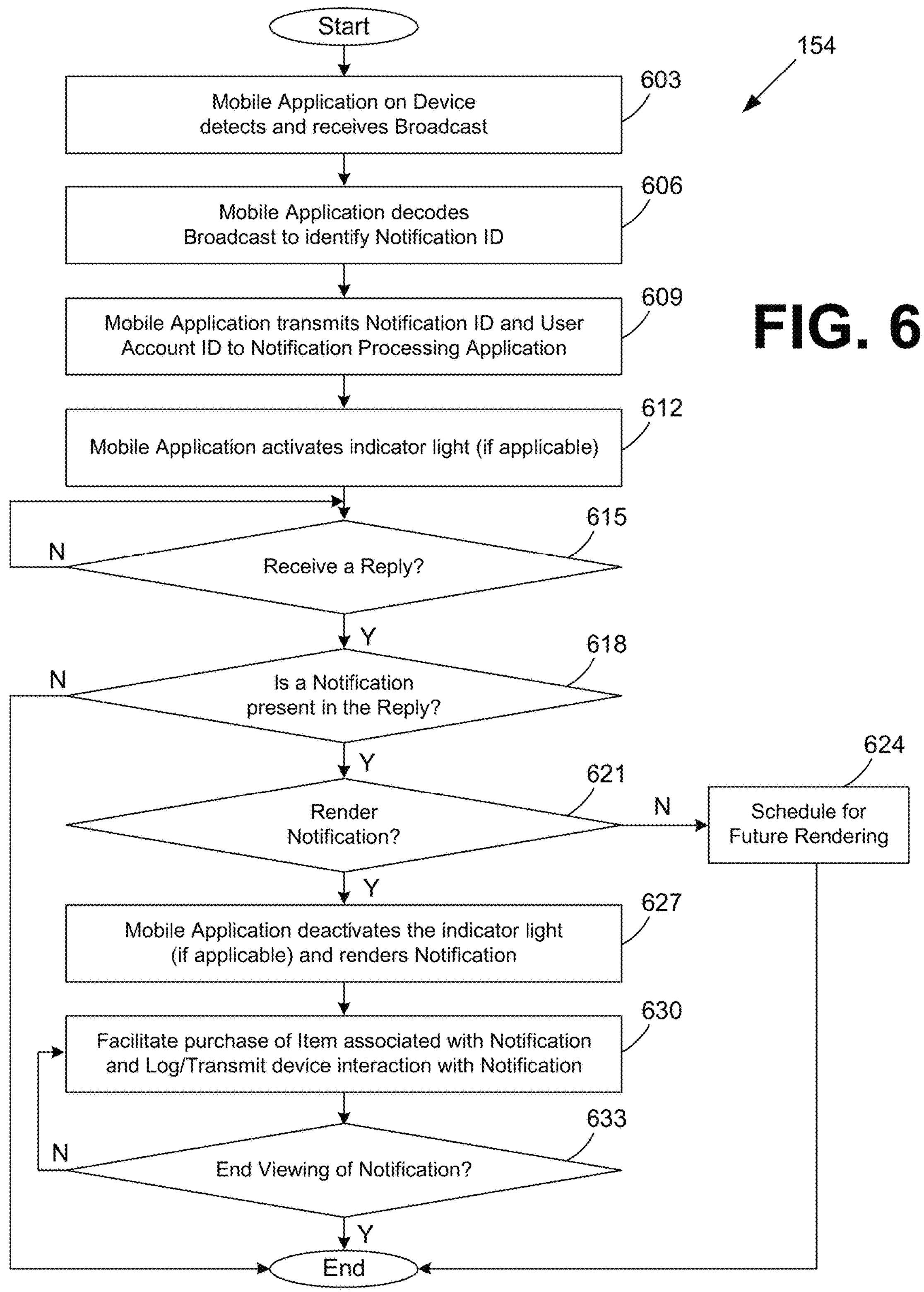
FIG. 6 is a flowchart illustrating one example of functionality implemented as portions of the mobile notification application executed in a client in the networked environment of FIG. 1 according to various embodiments of the present disclosure.

Referring next to FIG. 6, shown is a flowchart that provides one example of the operation of a portion of the mobile notification application 154 (FIG. 1) according to various embodiments. It is understood that the flowchart of FIG. 6 provides merely an example of the many different types of functional arrangements that may be employed to implement the operation of the portion of the mobile notification application 154 as described herein. As an alternative, the flowchart of FIG. 6 may be viewed as depicting an example of steps of a method implemented in the client 106 (FIG. 1) according to one or more embodiments. It is also understood that the functions performed by the mobile notification application 154 may also be implemented in hardware.

Beginning with box 603, the mobile notification application 154 detects an identifier 132 (FIG. 1) from a rendering device 107 (FIG. 1). In box 606, the identifier 132 is decoded to identify, for example, a notification identification number 135 (FIG. 1) that may be unique to a notification 129 (FIG. 1) that may have been encoded in the identifier 132. Next, in box 609, the mobile notification application 154 may transmit the notification identification number 135 to the notification processing application 121 (FIG. 1) to associate the notification identification number 135 with a notification 129. In box 612, an indicator 215 (FIG. 2) may be activated by the mobile notification application 154 to notify a user of an impending notification 129.

After the notification processing application 121 associates the notification identification number 135 with a notification 129, it is understood that the notification processing application 121 will transfer a reply to the client 106 (FIG. 1) via network 109 (FIG. 1). In box 615, it is determined whether a reply has been received from the notification processing application 121. If a reply has not yet been received, the mobile notification application 154 may continue checking until a reply has been received. In box 618, if it is determined that a reply has been received, the mobile notification application 154 may then determine whether a notification 129 is present in the reply. If a notification 129 is not present in the reply, the mobile notification application 154 may suspend operations until a new identifier 132 is detected. Alternatively, if a notification is present, a determination in box 621 is made whether to render the notification 129 in the display 157. For example, a user of the mobile device 106*a* (FIG. 2) may be on a phone call or utilizing another application and it may be determined that the notification is to not be rendered in the display 157 at that time. Alternatively, the user may have customized settlings in the mobile notification application 154 to not render notifications 129 at a particular time. If so, in box 624, the rendering of the notification 129 may be scheduled for another time. For example, a notification 129 may be associated with a timestamp comprising a time in the future to render the notification 129 in a display. The mobile notification application 154 may render the notification 129 when the current time on the client 106 matches the timestamp associated with the notification 129.

In box 627, if it is determined to render the notification 129, the mobile device 106*a* may deactivate the indicator 215, if applicable, and render the notification 129 in the display. In box 630, a purchase of an item associated with the notification 129 is facilitated. For example, buttons may be rendered on the display to give a user of the mobile device 106*a* the opportunity to purchase the item associated with the notification 129. Alternatively, other options may be presented to the user in the form of a button or any other form associated with the notification 129. For example, a notification 129 may request the mobile notification application 154 to provide a user with a link to a website containing more information about an item associated with the notification 129.

Additionally, in box 630, the interactions of the device are logged on the mobile device 106*a* by the mobile notification application 154. Interactions with the device, for example, may include: the time the notification 129 remains rendered in the display 157, whether the user manipulates any part of the notification 129, whether the user adds the item to an electronic shopping cart 123 and/or electronic wish list 126, whether the user requests the notification 129 be removed from the display, and/or any other interactions. The log may be transmitted to the notification processing application 121 at various times. In box 633, it is determined whether the viewing of the notification should be ended. If not, the device interactions may continue to be logged in box 630. Alternatively, if is determined to end the viewing of the notification, the notification 129 may be removed from the display 157.

Figure 7:
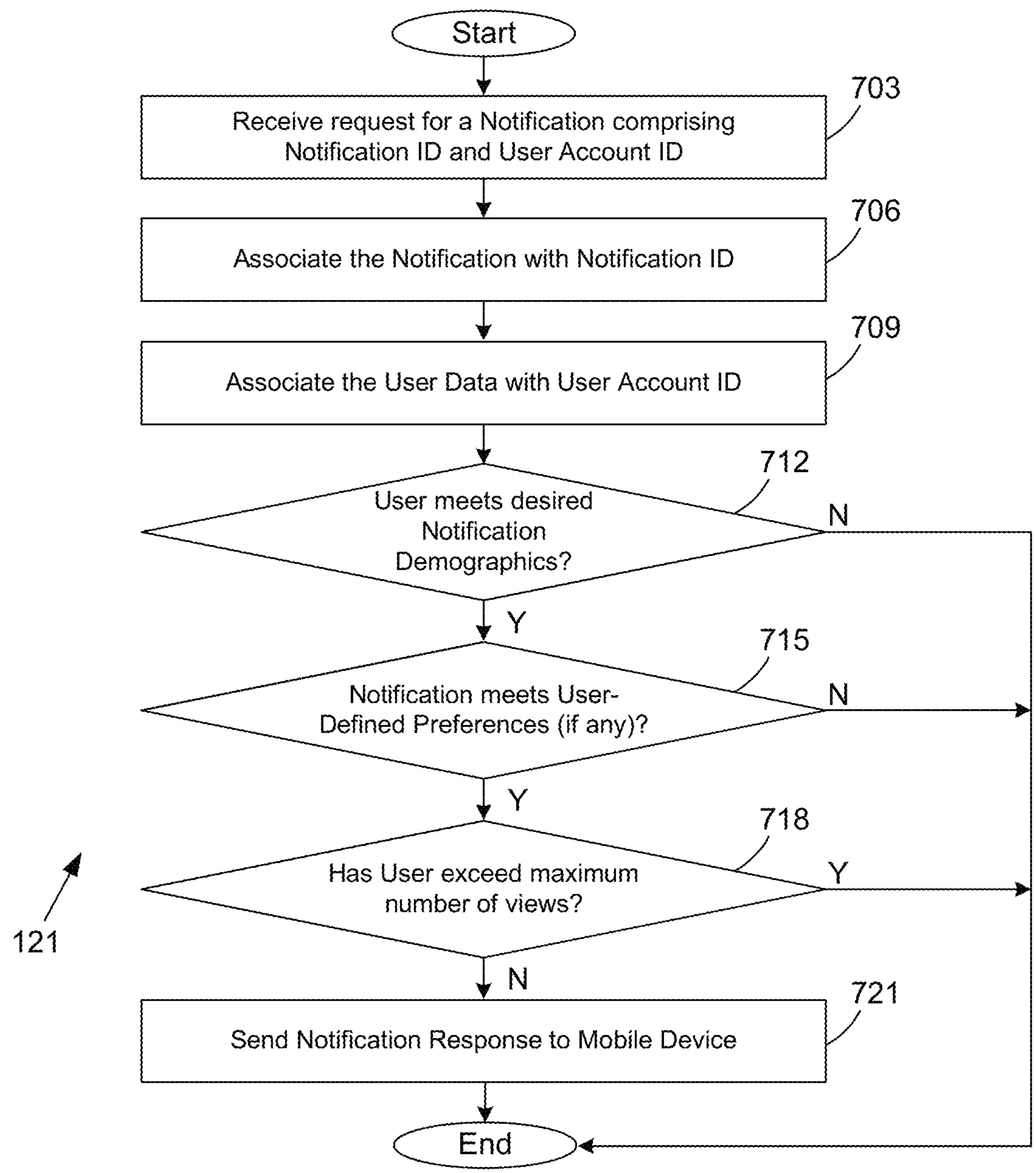
FIG. 7 is a flowchart illustrating one example of functionality implemented as portions of the notification processing application executed in a computing device in the networked environment of FIG. 1 according to various embodiments of the present disclosure.

Referring next to FIG. 7, shown is a flowchart that provides one example of the operation of a portion of the notification processing application 121 (FIG. 1) according to various embodiments. It is understood that the flowchart of FIG. 7 provides merely an example of the many different types of functional arrangements that may be employed to implement the operation of the portion of the notification processing application 121 as described herein. As an alternative, the flowchart of FIG. 7 may be viewed as depicting an example of steps of a method implemented in the computing device 103 (FIG. 1) according to one or more embodiments.

Beginning with box 703, the notification processing application 121 may receive a request for a notification. The request may comprise a notification identification number 135 (FIG. 1) and a user account identification number 138 (FIG. 1). Next, in box 706, the notification identification number 135 is associated with a notification 129 (FIG. 1). In box 709, the user account identification number 138 may be associated with a user account 142 (FIG. 1). In box 712, it may be determined from the user account 142 and the notification 129 whether the user meets the desired notification demographics. For example, certain notifications 129 may be targeted exclusively to certain demographics. If it is determined that the user does not meet the notification demographics, the notification 129 may not be returned to the requesting device. Alternatively, if the user meets the notification demographics, it may be determined in box 715 whether the notification meets user-defined preferences, if applicable. For example, user-defined preferences may include a user opting not to receive notifications at a particular time, from a particular brand, of a particular product, and/or any other preferences. If it is determined that the user does not meet the user-defined preferences, the notification 129 may not be returned to the requesting device.

In box 718, it may be determined whether the notification 129 has exceeded the maximum number of views. For example, a notification 129 may have a limit of ten device renderings to prevent annoyance of a user. If a notification 129 has exceeded a maximum number of views, the notification 129 may not be rendered on the mobile device. Alternatively, in box 721, if it is determined that a notification 129 has not exceeded a maximum number of views, the notification may be sent in a response to the mobile device 106*a*.

Figure 8:
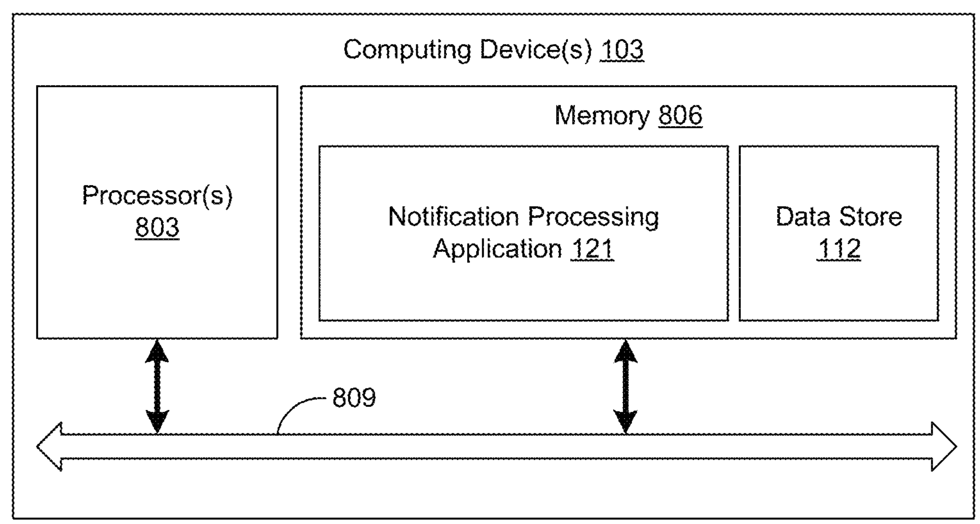
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are an electronic commerce application (FIG. 1), a notification processing application 121 (FIG. 1), and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce application 115, the notification processing application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 7 show the functionality and operation of an implementation of portions of the mobile notification application 154 (FIG. 1) and the notification processing application 121, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. In addition, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

In addition, any logic or application described herein, including the electronic commerce application 115, the notification processing application 121, and the mobile notification application 154, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

a client device in data communication with at least one remote computing device over a network; and program instructions executable in the client device that, when executed by the client device, cause the client device to:

capture an audio signal broadcast wirelessly from a transmitting device using a microphone of the client device, wherein the audio signal comprisesa human-imperceptible portion;

decode the human-imperceptible portion of the audio signal to access at least one unique identifier encoded within the audio signal;

cause a transmission of a request for at least one notification to the at least one remote computing device over the network, wherein the request comprises the at least one unique identifier, wherein the at least one remote computing device is configured to:

perform at least one query on a data store accessible by the at least one remote computing device to identify the at least one notification to present on the client device, wherein the at least one query comprises the at least one unique identifier; and determine that the client device has not been presented with the at least one notification within a predefined time range while the client device is within a predefined distance of a location;

communicate the at least one notification to the client device over the network;

in response to the transmission of the request, store the at least one notification received from the at least one remote computing device locally in memory of the client device; and cause the at least one notification to be rendered in a display of the client device.

2. The system of claim 1, further comprising program instructions executable in the client device that, when executed by the client device, cause the client device to:

cause a light emitting diode (LED) of the client device to illuminate until the at least one notification is rendered in the display when a receipt of the at least one notification from the at least one remote computing device is pending after the transmission of the request; or cause at least one icon to be rendered in the display of the client device until the at least one notification is rendered in the display when the receipt of the at least one notification from the at least one remote computing device is pending after the transmission of the request.

3. The system of claim 1, further comprising program instructions executable in the client device that, when executed by the client device, cause the client device to remove the at least one notification from being rendered in the display after a predetermined length of time or in response to a predetermined user input being detected on the client device.

4. The system of claim 1, further comprising program instructions executable in the client device that, when executed by the client device, cause the client device to:

locate a user account identifier corresponding to a user of the client device in response to the user of the client device providing user account authentication data on the client device; and wherein identifying the at least one notification is based at least in part on the user account identifier.

5. The system of claim 1, wherein identifying the at least one notification is based at least in part on a location of the client device or a location of the transmitting device.

6. The system of claim 5, wherein the transmitting device comprises the display and at least one speaker.

7. The system of claim 6, wherein the transmitting device is a television.

8. The system of claim 5, wherein the transmitting device is a device dedicated to communicating the audio signal or another audio signal comprising a different unique identifier.

9. A system, comprising:

at least one computing device in data communication with a client device over a network; and program instructions executable in the at least one computing device that, when executed by the at least one computing device, cause the at least one computing device to:

receive a communication from the client device in response to the client device capturing an audio signal broadcast wirelessly from a transmitting device, the communication comprising at least one unique identifier decoded from a human-imperceptible portion of the audio signal by the client device;

identify at least one notification to present on the client device based at least in part on the at least one unique identifier and a location of the client device, wherein the at least one unique identifier corresponds to the at least one notification or to the transmitting device;

cause the at least one computing device to determine that the client device has not been presented with the at least one notification within a predefined time range while the client device is within a predefined distance of the location; and communicate data pertaining to the at least one notification to the client device over the network, wherein receipt of the data pertaining to the at least one notification at the client device causes the client device to render the at least one notification in a display.

10. The system of claim 9, further comprising program instructions executable in the at least one computing device that, when executed by the at least one computing device, cause the at least one computing device to maintain a log comprising at least one interaction performed on the client device in association with the at least one notification while the at least one notification is rendered.

11. The system of claim 9, further comprising program instructions executable in the at least one computing device that, when executed by the at least one computing device, cause the at least one computing device to receive a user account identifier corresponding to a user of the client device in the communication, where the user of the client device provided user account authentication data on the client device.

12. The system of claim 11, further comprising program instructions executable in the at least one computing device that, when executed by the at least one computing device, cause the at least one computing device to determine that the user meets a desired notification demographic associated with the at least one notification.

13. The system of claim 11, further comprising program instructions executable in the at least one computing device that, when executed by the at least one computing device, cause the at least one computing device to determine that the at least one notification complies with a user-defined preference specified on the client device.

14. The system of claim 11, further comprising program instructions executable in the at least one computing device that, when executed by the at least one computing device, cause the at least one computing device to determine that the at least one notification has exceeded a maximum number of views on the client device.

15. A computer-implemented method, comprising:

capturing, by a client device comprising at least one hardware processor, an audio signal broadcast wirelessly from a broadcasting device, wherein the audio signal comprises a human-imperceptible portion;

decoding, by the client device, the human-imperceptible portion of the audio signal to access at least one unique identifier encoded within the audio signal;

transmitting, by the client device, a request to a notification service over a network, wherein the request comprises the at least one unique identifier, wherein the notification service is configured to:

identify at least one of a plurality of notifications stored in a data store to present on the client device, wherein the at least one of the plurality of notifications is identified based at least in part on the at least one unique identifier;

determine that the client device has not been presented with the at least one of the plurality of notifications within a predefined time range while the client device is within a predefined distance of a location; and communicate the at least one of the plurality of notifications to the client device over the network; and causing, by the client device, the at least one of the plurality of notifications to be rendered in a display of the client device.

16. The computer-implemented method of claim 15, further comprising causing, by the client device, a speaker of the client device to render audio associated with the at least one of the plurality of notifications while the at least one of the plurality of notifications is rendered in the display.

17. The computer-implemented method of claim 15, wherein the audio signal further comprises a human-perceptible portion.

18. The computer-implemented method of claim 15, wherein the broadcasting device emits the audio signal for a predefined period of time.

19. The computer-implemented method of claim 18, wherein the at least one of the plurality of notifications is rendered in the display of the client device prior to an end of the predefined period of time.

20. The computer-implemented method of claim 15, further comprising scheduling, by the client device, a time to render the at least one of the plurality of notifications to be displayed of the client device.

* * * * *